United States Patent
Shinogi (10) Patent No.: US 6,894,403 B2
(45) Date of Patent: May 17, 2005

(54) ENGINE GENERATOR APPARATUS (75) Inventor: Yoshihisa Shinogi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/773,301

(22) Filed: Feb. 9, 2004

(65) Prior Publication Data
US 2004/0164559 A1 Aug. 26, 2004

(30) Foreign Application Priority Data
Feb. 25, 2003 (JP) .................................... 2003-047293

(51) Int. Cl.⁷ .......................................... F02D 29/06
(52) U.S. Cl. ...................... 290/40 R; 60/660; 322/17
(58) Field of Search .......................... 290/40 R; 60/660

(56) References Cited

U.S. PATENT DOCUMENTS

| | | | |
|---|---|---|---|
| 4,989,565 A | 2/1991 | Shimomura et al. | 123/339 |
| 5,170,622 A * | 12/1992 | Cheng | 60/775 |
| 5,949,146 A * | 9/1999 | VandenBerghe | 290/40 R |
| 6,230,480 B1 * | 5/2001 | Rollins, III | 60/39.182 |
| 6,286,316 B1 * | 9/2001 | Waldrop et al. | 60/660 |
| 6,290,142 B1 | 9/2001 | Togawa et al. | 237/12.1 |
| 6,630,816 B2 | 10/2003 | Kotani et al. | 322/37 |
| 6,717,387 B2 * | 4/2004 | Kotani et al. | 322/28 |
| 6,744,239 B2 * | 6/2004 | Fukushima et al. | 322/8 |

FOREIGN PATENT DOCUMENTS

| | | |
|---|---|---|
| EP | 0 286 377 | 10/1988 |
| EP | 1 187 292 | 3/2002 |
| JP | 2000-297700 | 10/2000 |
| JP | 2002-70607 | 3/2002 |

* cited by examiner

Primary Examiner—Joseph Waks
(74) Attorney, Agent, or Firm—Westerman, Hattori, Daniels & Adrian, LLP (57) ABSTRACT An engine generator apparatus controls the air-fuel ratio in response to the stable output of an oxygen sensor. When a system protector 138 detects a disorder in a power network, it outputs failure signal. A connection relay 135 is opened in response to the failure signal to release connection of a generator to the power network to release load. When the failure signal is not detected, a load determination section 41 urges a proportional valve controller 40 and the controller 40 drives a valve 35 corresponding to the oxygen density to perform a control of the air-fuel ratio. The load determination section 41 determines that the load is released by the failure signal to send a notification of no load to the controller 40. The controller 40 stops the control of the air-fuel ratio based on the oxygen density in response to this notification.

5 Claims, 8 Drawing Sheets

ENGINE GENERATOR APPARATUS

BACKGROUND OF THE INVENTION

1. Field of the Invention

The present invention relates to an engine generator apparatus and in particular, to an engine generator apparatus provided with a purifier of engine exhaust.

2. Description of the Related Art

In recent years, there has been a widespread use of compact generator apparatus capable of being easily installed relatively. Further, there are indications that a widespread use of co-generation type engine generator apparatus that not only generate electric power but also utilize exhaust heat generated when an engine for generating electric power is operated to enhance operation efficiency. A study of reducing the physical size of this type of engine generator apparatus for domestic use has been also conducted.

In this kind of generator apparatus, in order to give special considerations to atmospheric environment, for example, in a case where a generator driven by a gasoline engine or a gas engine is used, the air-fuel ratio of an air-fuel mixture supplied to the engine is controlled to a theoretical air-fuel ratio to purify exhaust gas.

In the above-mentioned control of an air-fuel ratio, an oxygen sensor with which the oxygen density is sensed is provided in the exhaust passage of the engine needs to be kept at a temperature in which the sensor can stably operate, that is, a temperature for activating the sensor (for example, 400° C.). An exhaust temperature and an exhaust speed also have an effect on the temperature for activating the sensor, so usually, an engine revolution speed range and a throttle opening (or a fuel injection quantity) range are previously set such that the senor is operated within a predetermined operating zone calculated from these ranges.

In a case where the engine is operated almost at a constant speed, the operating zone of the oxygen sensor is not required to be set: for example, in the above engine generator apparatus, in a case where the engine is operated almost at a constant speed of increasing operation efficiency by the use of a governor of the number of revolutions.

However, if the revolution speed of the engine is set almost at a constant speed in the engine generator apparatus, when an electric load is eliminated or extremely reduced, the range of variation in the number of revolutions of the engine increases, so the detection signal of the oxygen sensor is likely to become unstable.

One example of an engine generator apparatus in which an electric load is varied is that the engine generator apparatus is interconnected to a power network or grid (for example, Japanese Unexamined Patent Publication No. 2002-70607). In this example, when the engine generator apparatus is released from the power network because of power failure, the load is also isolated at the same time to bring the engine generator apparatus into a no-load operation to increase variation in the number of revolutions, which is likely to cause an unstable output of the oxygen sensor.

SUMMARY OF THE INVENTION

An object of the invention is to provide an engine generator apparatus that has a controller, which can control an engine at a stable air-fuel ratio with a simple construction.

According to the first feature of the invention, there is provided an engine generator apparatus in which the air-fuel ratio of an engine for driving a generator is controlled on the basis of the detection signal of an oxygen sensor. The engine generator apparatus is characterized in that the engine is controlled so as to rotate almost at a constant speed and that when an electric load more than a predetermined magnitude is connected to the generator, a control of the air-fuel ratio of the engine is started.

Further, according to the second feature of the invention, the engine generator apparatus is characterized in that when the generator is brought into a no-load operating state, the control of the air-fuel ratio of the engine is stopped.

According to a first feature or a second feature, the control of the air-fuel ratio responsive to an oxygen density is started and stopped corresponding to respective predetermined state of the electric load. In particular, in the no-load operating state, the control of an air-fuel ratio is not performed, and in a stable operating state where the electric load is applied to the generator, the control of the air-fuel ratio by the feedback of the oxygen density can be performed.

Further, according to a third feature of the invention, the engine generator apparatus is characterized in that electric power generated by the generator is supplied to the load and that the engine generator apparatus is interconnected to a power network and that when a disorder occurs in interconnection of the engine generator apparatus to the power network, the interconnection of the engine generator apparatus to the power network is released.

In a case where a fail such as power failure occurs and the engine generator apparatus is released from the power network, the generator is brought into no load. According to the third feature, it is possible to release the control of an air-fuel ratio based on the oxygen density in the region where the detection value of the oxygen sensor is estimated to become unstable due to the no-load operation.

Further, according to a fourth feature of the invention, the engine generator apparatus is characterized in that the engine and the generator form parts of a co-generation system provided with an exhaust heat utilizing unit as an electric load and that the engine is started by a heat request signal from the exhaust heat utilizing unit.

According to the fourth feature, the engine is started in response to a heat request, in other words, the engine is started to generate electric power in a state where the electric load is already connected to the generator. Therefore, in this case, the control of an air-fuel ratio can be quickly started.

DETAILED DESCRIPTION OF THE PREFERRED EMBODIMENTS

Figure 1:
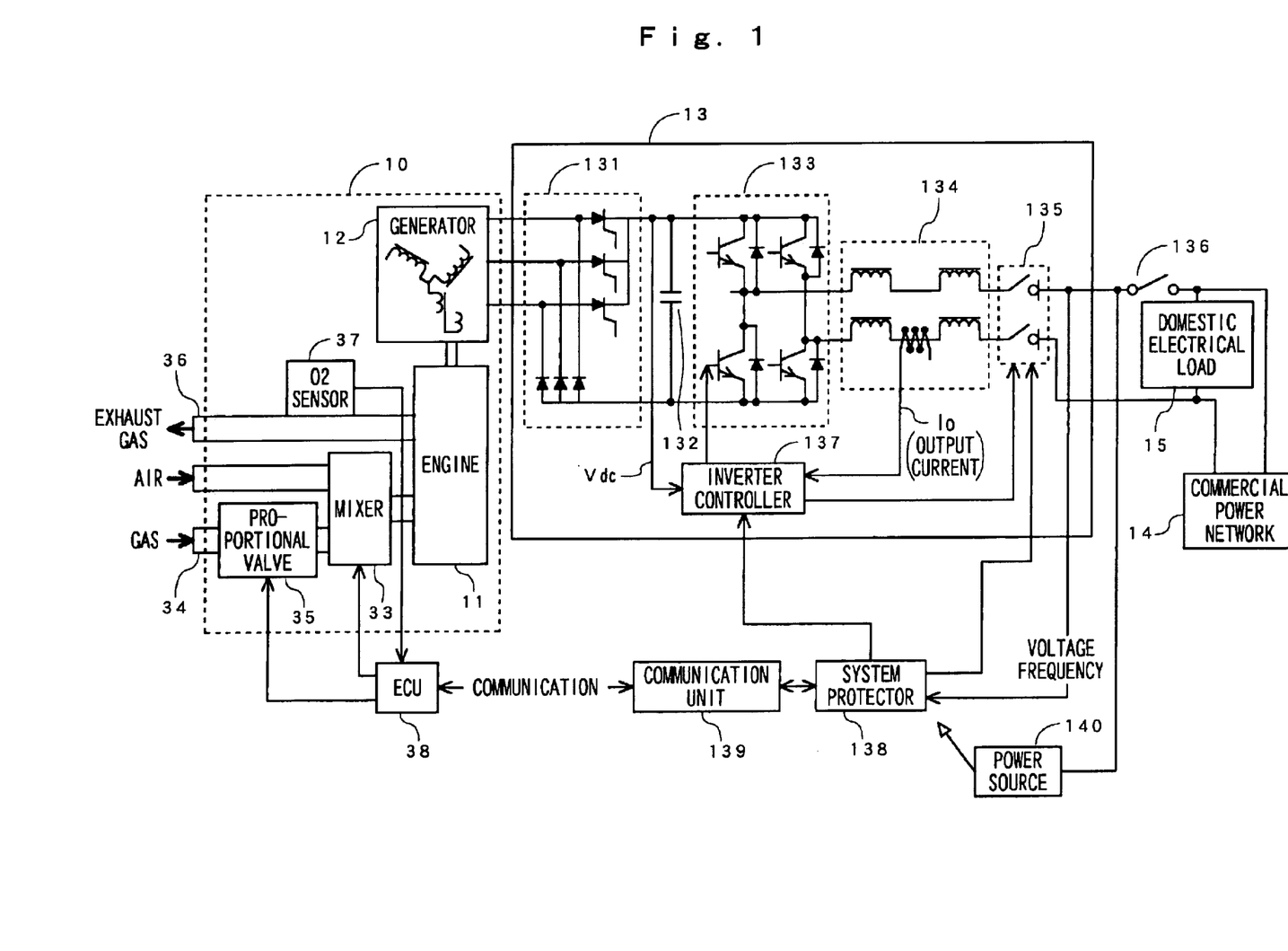
FIG. 1 is a block diagram of an engine generator apparatus illustrating one embodiment of the present invention.

One embodiment of the present invention will be described in more detail referring to the relevant drawings. FIG. 1 is a block diagram of the engine generator apparatus. As shown, an engine generator 10 comprises an engine 11 and a generator 12. The generator 12 is driven by the engine 11 for generating an alternating current output responding to the number of revolutions. The generator 12 comprises a rotor joined to the engine 11 and a stator on which three phase windings are wound. The rotor and the stator are not shown in FIG. 1. The output terminal of the three phase windings is connected with an inverter unit 13. The inverter unit 13 converts the alternating current output of the generator 12 into an alternating current of the quality equivalent (in voltage, frequency, noise, and other factors) to that of the commercial power network, and then the output is interconnected with the commercial power network as timed in phase with the same of the network.

More specifically, the inverter unit 13 comprises a converter 131 for converting the alternating current output of the generator 12 into a direct current, an inverter circuit 133 for converting the direct current received from the converter 131 into an alternating current with the frequency and the voltage of the commercial power network, a filter circuit 134, and a connector relay 135. The alternating current output of the inverter unit 13 is connected with a main switch 136 to the commercial power network 14 and also is connected to a domestic electrical load 15 (for example, in a household or domestic use power source).

Also, the inverter unit 13 includes an inverter controller 137 for switch controlling the FETs of the inverter circuit 133, the FETs are connected as shown in FIG. 1. The inverter controller 137 are arranged responsive to an output current Io of the inverter circuit 133, an output voltage Vdc of the converter circuit 131, and a signal from a system protector 138 for controlling the switching action of the connector relay 135 as providing a function for protecting the inverter circuit 133.

The system protector 138 monitors the voltage and frequency of the output of the inverter unit 13 and if the voltage or the frequency is different from the reference level or the failure of the power supply is occurred, generates and supplies an error signal to the inverter controller 137 which in turn open the connector relay 135 thus release the interconnection to the commercial power network to protect the system. Failure in the power supply may be judged from jumping in the phase of the power network. Alternatively, while the inverter output is periodically shifted in the phase, the failure may be judged from a phase shift degree of the network 14. The inverter controller 137 includes a nonvolatile memory such as an EEPROM for storage of data of the failure and data of the (unusual) stop motion when the failure takes place in the inverter unit 13 or the commercial power network 14.

The connector relay 135 is closed to connect the inverter unit 13 for parallel operation and is opened to disconnect the inverter unit 13 for parallel off. In addition, the connector relay 135 serves as a disconnector for protection of the power network and is opened instantly when the power network has a fault. The inverter controller 137 and the system protector 138, either may be implemented by a microcomputer, controls the switching action of the connector relay 135. The connector relay 135 remains opened (parallel operation is released) when the main switch 136 is disconnected.

An ECU 38 is provided for controlling the engine 11. When the connector relay 135 is kept opened at a predetermined length of time, the ECU 38 generates a stop signal to stop the engine 11. The ECU 38 hence includes a nonvolatile memory such as an EEPROM for storage of data of the fault or data of the stop motion by the fault as well as a display such as an LED for displaying the fault.

A communications unit 139 is provided between the ECU 38 and a combination (which may be referred to as an inverter side opposite to the ECU side) of the inverter controller 137 and the system protector 138 for communication of each state of both sides. A power source 140 is connected to the output terminal of the inverter unit 13 for supplying power to a drive source and a control source for both the engine generator 10 and the inverter unit 13.

The engine 11 is supplied with a mixture of air and gas fuel produced by a mixer 33. A proportional valve 35 is provided across a gas intake tube 34 and its opening can determine the air-fuel ratio. The mixture of air and gas fuel is combusted in the engine 11 and exhausted from an exhaust tube 36. An oxygen sensor 37 is provided on the exhaust tube 36. In response to the density of oxygen detected by the oxygen sensor 37, the ECU 38 drives the proportional valve 35 to set the air-fuel ratio to theoretical air-fuel ratio for complete combustion. Before the oxygen sensor 37 is activated, the engine 11 is driven in a lean-burning mode in order to minimize the discharge of toxic substances in accordance with the exhaust regulations.

The control of the air-fuel ratio based on the oxygen density is not performed in a state of no load or close to no load in which the number of revolutions tends to be unstable. The control of the air-fuel ratio based on the oxygen density is performed only when an electric load 15 is connected to an engine generator 10. When the electric load 15 is isolated, the control of the air-fuel ratio based on the oxygen density is stopped. When a system protector 138 determines that the system is in disorder and opens a connection relay 135, the electric load 15 is isolated and the engine generator 10 is brought into no load. Hence, in this case, the control of the air-fuel ratio based on the oxygen density is stopped.

Figure 2:
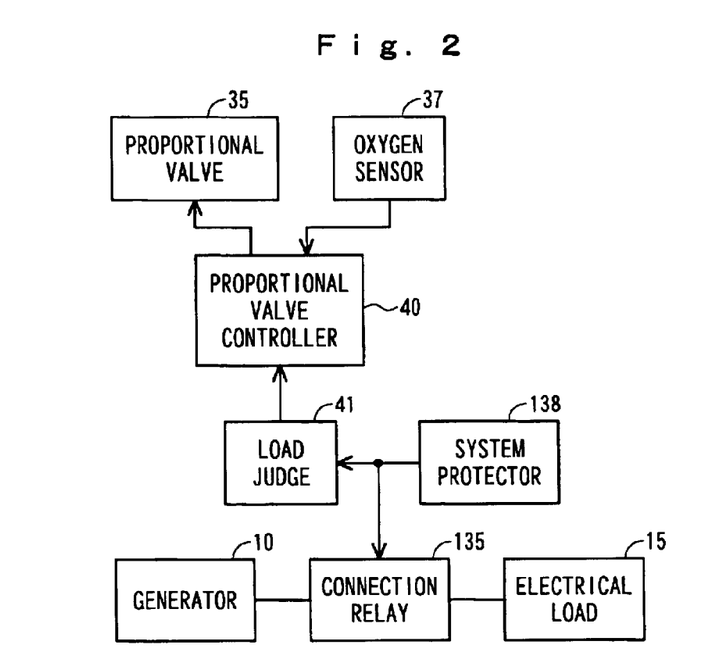
FIG. 2 is a block diagram of main function of a cogeneration system illustrating one embodiment of the present invention.

FIG. 2 is a functional block diagram showing the main portions of the invention. The same reference symbols as in FIG. 1 denote the same or equivalent parts. In FIG. 2, a proportional valve controller 40 adjusts a proportional valve 35 on the basis of the oxygen density detected by the oxygen sensor 37 and the like to perform the air-fuel ratio. A system protector 138 provides a command of opening the connection relay 135 upon the occurrence of an abnormal event such as power failure. A load judge 41 detects a signal showing the command of opening the connection relay 135 also. When the load judge 41 detects this signal, the load judge 41 determines that the engine generator 10 is brought into no load. Then, the load judge 41 outputs a command of stopping the control of the air-fuel ratio based on the oxygen density detected by the oxygen sensor 37 to the proportional valve controller 40 and the proportional valve controller 40 switches the operation mode of the proportional valve 35 to a no-load idling control operation based on a basic map.

Figure 3:
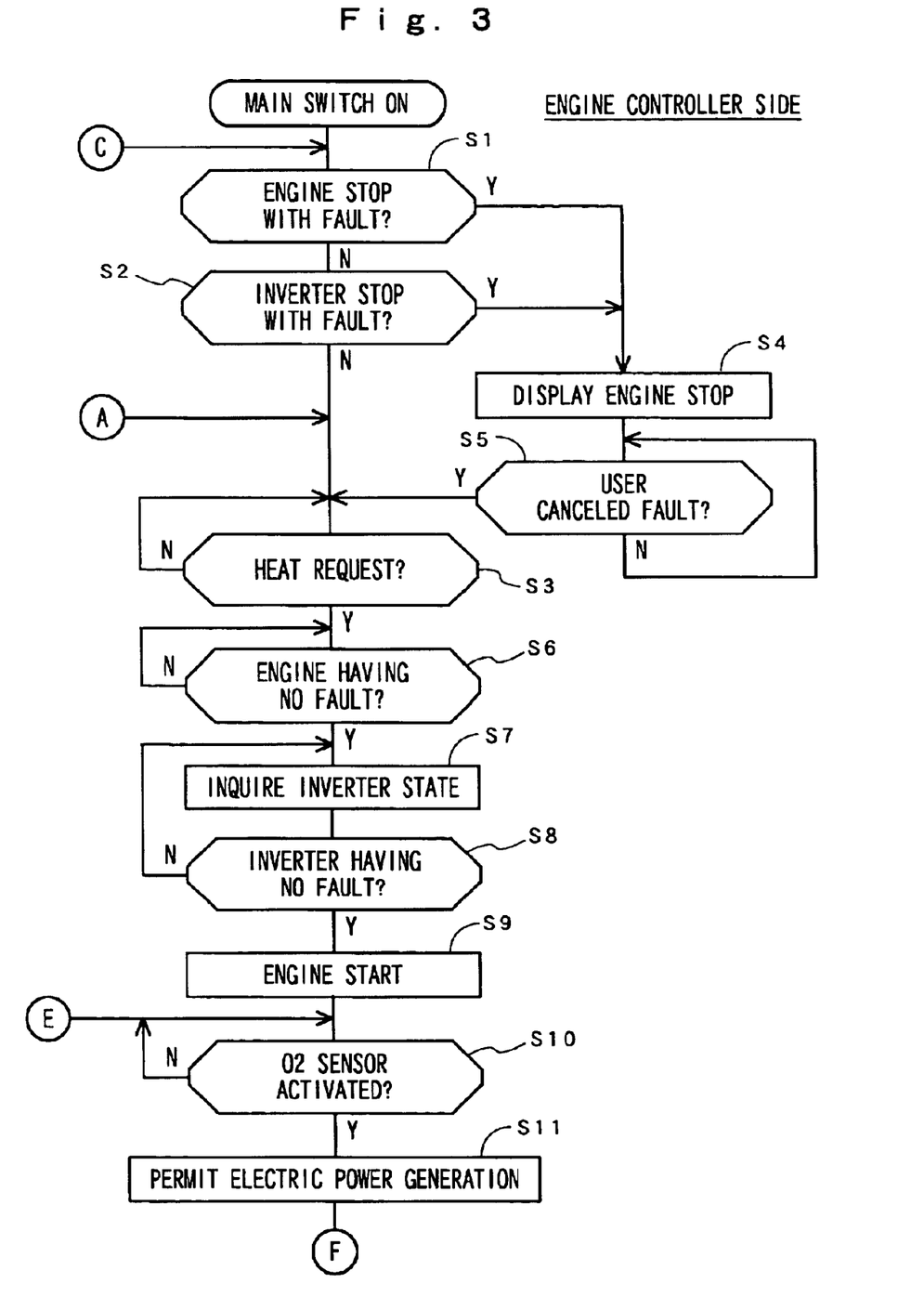
FIG. 3 is a flowchart showing the operation of an ECU at the start up.
Figure 4:
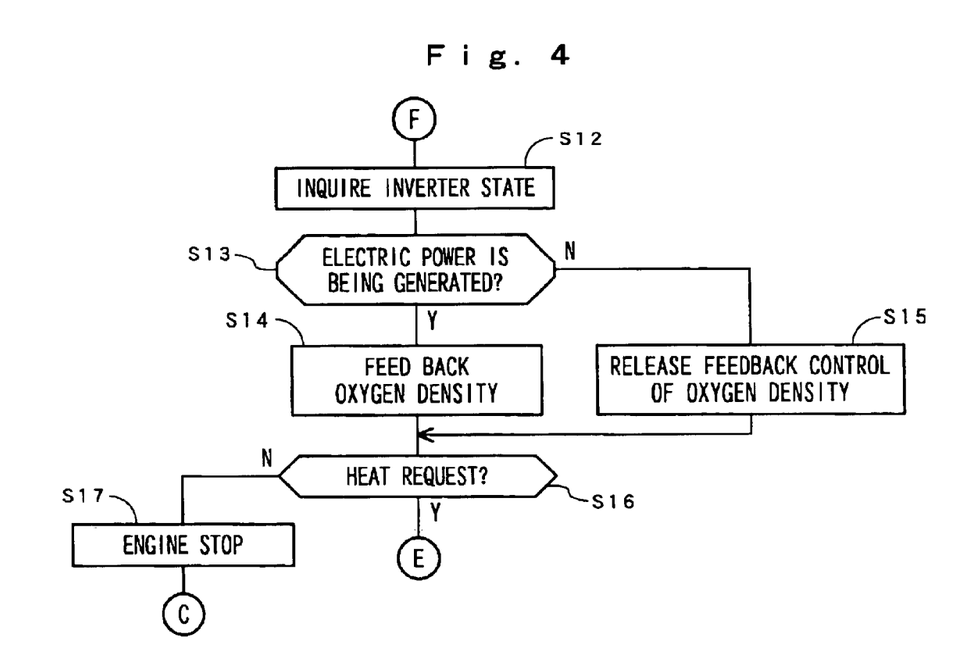
FIG. 4 is a flowchart showing continuation of that shown in FIG. 3.
Figure 5:
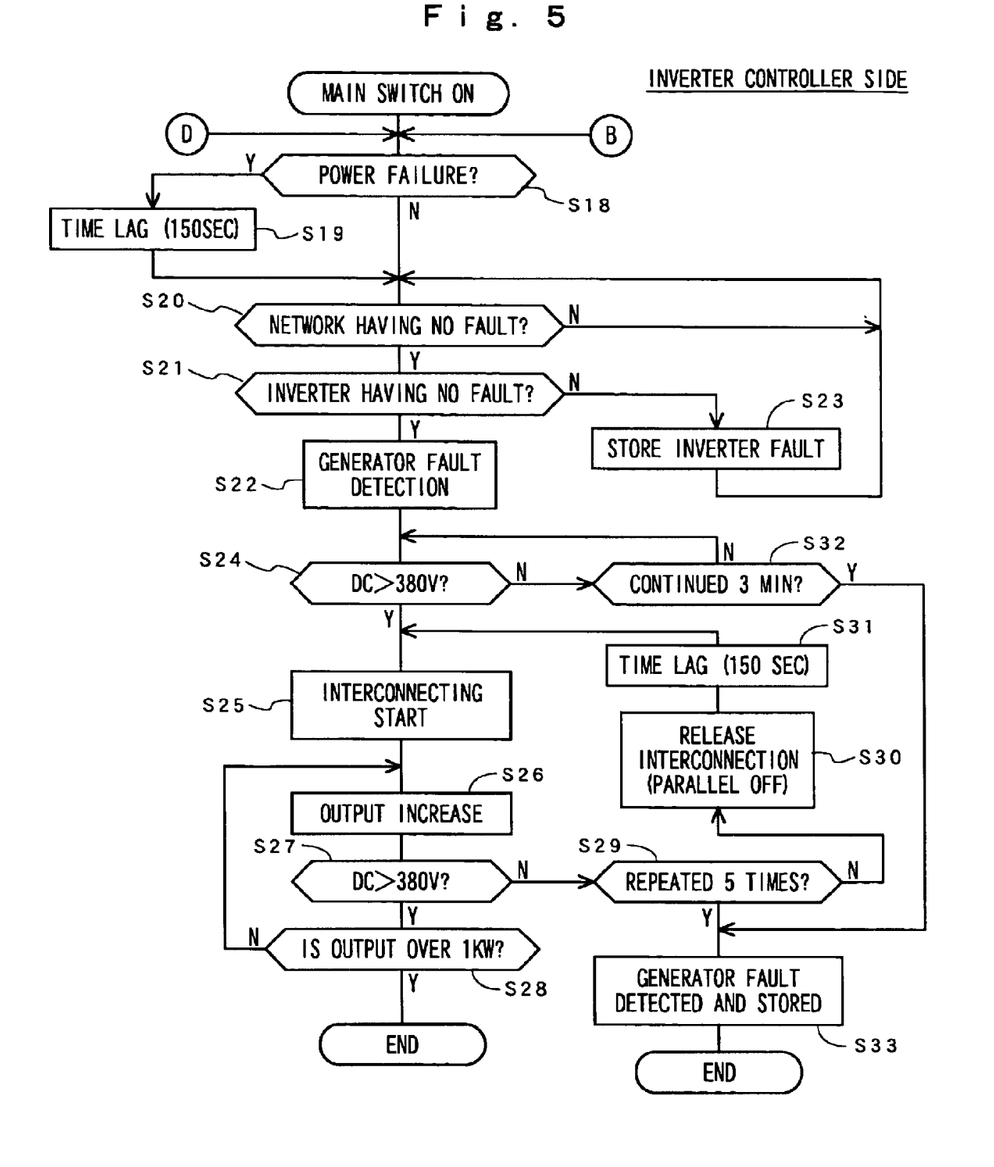
FIG. 5 is a flowchart showing the operation of an inverter controller at the start up.

FIGS. 3 through 5 is flowcharts showing the actions of the engine generator (or ECU) controller and the inverter controller of the engine generator 10 at the start up of the engine generator 10. The control action starts when the main switch 136 is turned on but the motion of the engine 11 is stopped by the occurrence of a fault.

The procedure of steps in the ECU 38 control side will now be explained referring to FIG. 3. At Step S1, it is judged from data stored in the nonvolatile memory provided in the ECU 38 whether or not the engine 11 is stopped by a fault on the engine 11. When the engine is stopped by a fault, the fault is displayed on the LED for notifying the user at Step S4. The data in the memory then remains unchanged. When the stop motion is not caused by the fault on the engine 11, the procedure advances to Step S2 for examining whether or not the stop motion is caused by a fault on the inverter unit 13. This examination is based on the data stored in the nonvolatile memory.

When the inverter unit 13 has a fault, the procedure jumps to Step S4. When the inverter unit 13 has no fault, the procedure goes to Step S3.

As it has been judged that the engine 11 is stopped by the fault on either the engine 11 or the inverter unit 13, the procedure goes to Step S4 for displaying the fault. This is followed by Step S5 where it is examined whether or not the engine stop is released by users handling. When the stop motion is canceled by the user ("yes" at Step S5), the procedure moves to Step S3. A switch (not shown) for canceling the stop motion by the fault may be provided independently of the main switch 136 in order to clear communication of the users mind for canceling the stop motion.

It is then examined at Step S3 whether a heat request is received or not from a controller (FIG. 7) for detecting the size of thermal load, i.e. the command for starting up the engine 11 is received or not. The thermal load in the form of a hot-water tank and the controller will be explained later in more detail.

When the heat request is received, the procedure goes to Step S6 where it is examined whether or not the engine 11 has a fault. If not, the procedure advances to Step S7 where the communication unit 139 is activated for inquiring of the inverter controller 137 about the state of the inverter unit 13. It is examined from a response from the inverter controller 137 at Step S8 whether the inverter unit 13 has a fault or not. If the inverter unit has not fault, the procedure goes to Step S9 for starting the engine 11. When the engine 11 is started up, its start is communicated to the inverter controller 137 through the communication unit 139.

At step S10, it is determined whether or not the oxygen sensor 37 is activated. If it is determined that the oxygen sensor 37 is activated, at step S11, a generation permit command, that is a command to permit starting an inverter is transmitted to an inverter control section 137 and the inverter control section 137 starts the inverter unit 13. The connection relay 16 is closed responding to the command that permits to generate electric power, and the inverter unit 13 is connected to a domestic load 15 of an electric load and a commercial power network. Whether or not the oxygen sensor 37 is activated is determined by that a predetermined period of time elapses after the engine is started or that the environmental temperature of the oxygen sensor 37 reaches a predetermined temperature.

At step S12 in FIG. 4, inquire of the inverter control section 137 the state of the inverter unit 13. At step S13, it is determined on the basis of the state of the inverter unit 13 whether or not the electric power is being generated, in other words, whether or not the inverter unit 13 is generating output. In the case of the interconnection disorder, the connection relay 136 is opened to bring the generator into no load and hence it is determined that the electric power is not generated.

In a case where the electric power is being generated, in other words, in a case where electric load is connected to the generator, the program proceeds to step S14 where a feedback control of the air-fuel ratio responsive to the oxygen density is performed. On the other hand, in a case where the electric power is not being generated, in other words, in a case where electric load is not connected to the generator because of the interconnection disorder or the like, the program proceeds to step S15 where a feedback control of the air-fuel ratio responsive to the oxygen density is stopped.

At step S16, it is determined whether or not the heat request is made. If the heat request is made, the program proceeds to step S10 and if the heat request is not made, the program proceeds to step S17 where the engine is stopped.

The process in the inverter controller 137 will now be explained referring to FIG. 5. As the main switch 136 has been turned on, it is examined from the data in the nonvolatile memory at Step S18 whether a power failure is detected or not. When the power failure is detected, the procedure goes to Step S19 for hesitation or time lag. After the hesitation of a predetermined length of time (e.g. 150 seconds), the procedure goes to Step S20. If no power failure is detected, the procedure jumps to Step S20 from Step S18 with skipping step S19.

The time lag at Step S19 has the following advantage. After a power failure occurs, its location may be identified through temporally re-energizing that is operated by the power company. Once a power failure occurs, it may be repeated after the re-energization. If so, when a power failure occurs with the main switch 136 being connected, the following re-energization starts up the generator apparatus. This may make the investigation for finding the cause of the power failure difficult. However, the hesitation or time lag of 150 seconds provides ease of the investigation.

It is then examined at Step S20 whether the power network has a fault or not. If the power network has not fault, the procedure goes to Step S21 where it is examined whether the inverter unit 13 now has a fault or not. If there is not a fault, the procedure moves to Step S22 for starting the checkup of the generator 12. When the inverter unit 13 has a fault, the procedure goes to Step S23 for storing a memory with a data of "inverter fault" and returns back to Step S20.

When it is judged at Step S20 that the power network has a fault, the judgment at Step S20 is maintained until the fault on the power network is eliminated. The data in the nonvolatile memory indicative of the fault of the inverter unit 13 is cleared when the user cancels the usual state and the judgment at Step S5 is affirmative. As a result, the inverter fault is eliminated. This information about the inverter unit 13 is transferred to the ECU 38 side as a response to the requiring at Step S7.

It is then examined at Step S24 whether the direct current voltage Vdc exceeds a predetermined level (e.g. 380 V) or not. When the voltage exceeds the predetermined level, the procedure advances to Step S25 where the connector relay 135 is closed by the signal or command of "inverter start permission" transmitted at Step S11 for starting the parallel operation with the commercial power network.

The output of the inverter unit 13 is increased at Step S26. It is examined at Step S27 whether or not the direct current voltage Vdc is kept exceeding the predetermined level (e.g. 380 V). If the Step S27 is affirmative, the procedure advances to Step S28 where it is examined whether the output reaches a rated level (e.g. 1 kW) or not. If the output is not reached the rated level, the procedure returns back to Step S26 for increasing the output of the inverter unit 13.

When the output reaches its rated level, it is judged that the operation is normal and the procedure for examining the inverter fault at the start up is terminated. Because of Steps S26 to S28, the soft startup with gradually increasing the output can be performed.

On the other hand, when the direct current voltage Vdc is smaller than the predetermined level after increasing the output of the inverter unit 13 with the output that is lower than the rated level ("negative" at Step S28), the procedure moves to Step S29 from Step S27. It is examined at Step S29 whether or not the judgment that the direct current voltage Vdc is not higher than the predetermined level is repeated at a predetermined number of times (e.g. five times). If Step S29 is affirmative, it is judged that the generator 12 has a fault and the parallel operation with the commercial power network is canceled thus stopping the inverter controlling process. If it is judged "not" at Step S29, the procedure goes to Step S30 for canceling the parallel operation. After providing a time lag at Step S31 for the predetermined length of time (150 seconds), the procedure goes back to Step S25 for re-starting of the parallel operation. The procedure may be shifted to Step S24 from Step S31 instead of S25.

When it is judged negative at Step S24, the procedure goes to Step S32 where it is examined whether or not the direct current voltage Vdc is below the predetermined level throughout a predetermined length of time (e.g. three minutes). When the generator 12 has a fault, it is judged affirmative at Step S32 or affirmative at Step S29, and the procedure goes to Step S33. At Step S33, store the nonvolatile memory with the fault of the generator 12 and then the inverter control procedure is terminated.

Figure 6:
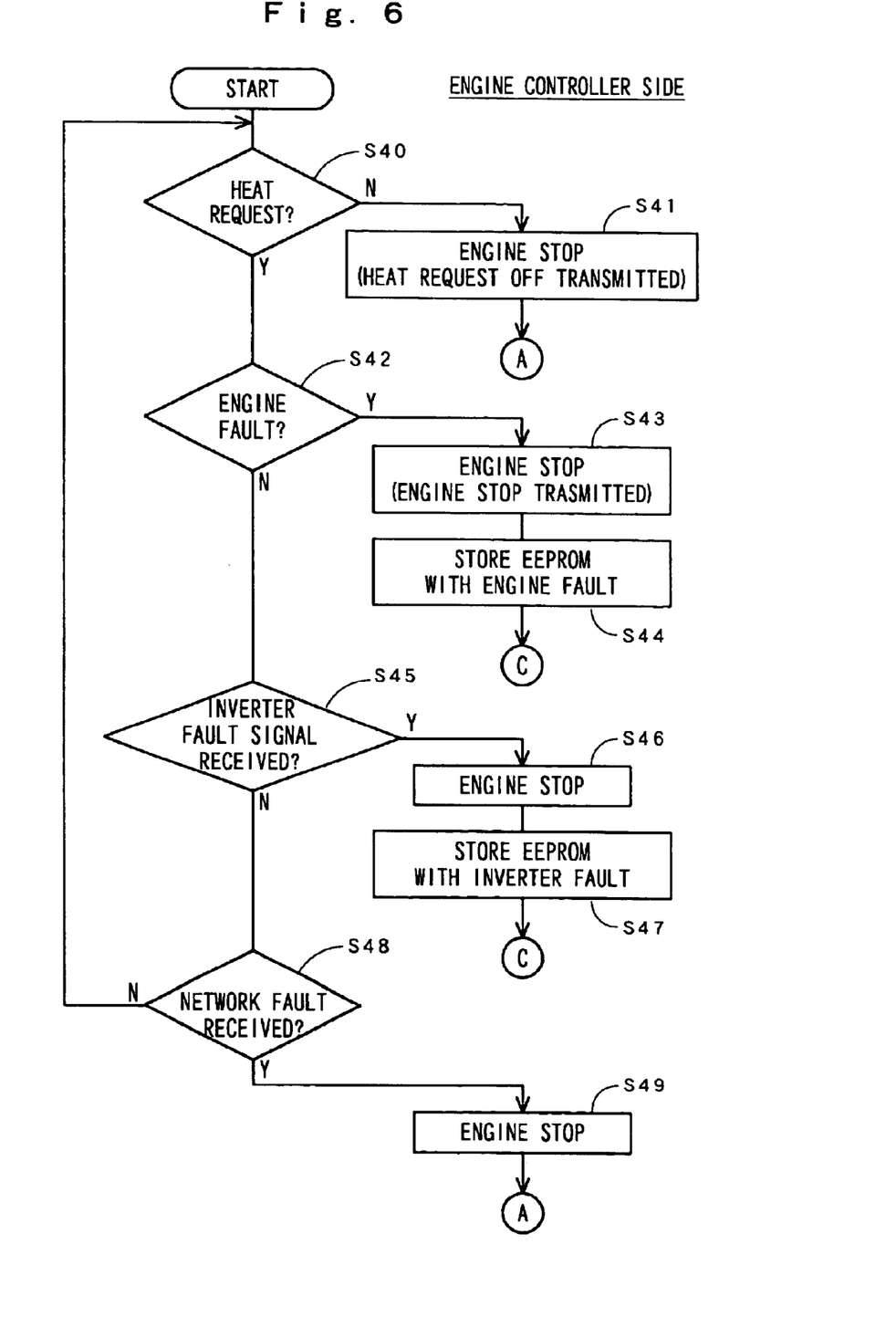
FIG. 6 is a flowchart showing the operation of the ECU when a fault occurs.

The procedure without the heat request or with the occurrence of a fault after the start up will be explained. FIG. 6 is a flowchart showing the process of the ECU 38. It is examined at Step S40 whether the heat request is received or not. If the request is not received, the procedure goes to Step S41 for stopping the engine 11. After stopping the engine 11, the procedure moves to Step S3 (FIG. 3) for waiting until the heat request is received. When the engine 11 is stopped with no heat request, its information is transferred to the inverter controller 137.

When the heat request is received, the procedure advances to Step S42 where it is examined whether the engine 11 has a fault or not. When the engine 11 has a fault, the procedure goes to Step S43 for stopping the engine 11. As the engine 11 stops, the nonvolatile memory is stored with the data of "engine fault" at Step S44 and then, the procedure moves back to Step S1. If the engine 11 is stopped by the fault on the engine 11, an information indicative of engine stop is transmitted to the inverter controller 137.

When the engine 11 has no fault, the procedure goes to Step S45. It is examined at Step S45 whether a fault signal indicative of a fault in the inverter unit 13 is received or not from the inverter controller 137. When the fault signal is received from of the inverter unit 13, the procedure moves to Step S46 for stopping the engine 11. Then, the nonvolatile memory is stored with a data of "inverter fault" at Step S47 and the procedure goes back to Step S1.

If the fault signal is not received from the inverter unit 13, the procedure goes to Step S48 where it is examined whether a signal indicative of power network fault is received or not from the inverter controller 137. When the power network fault signal is not received, the procedure moves to Step S40. When the signal indicative of power network fault is received, the procedure moves to Step S49 for stopping the engine 11 and the procedure returns to Step S3.

Figure 7:
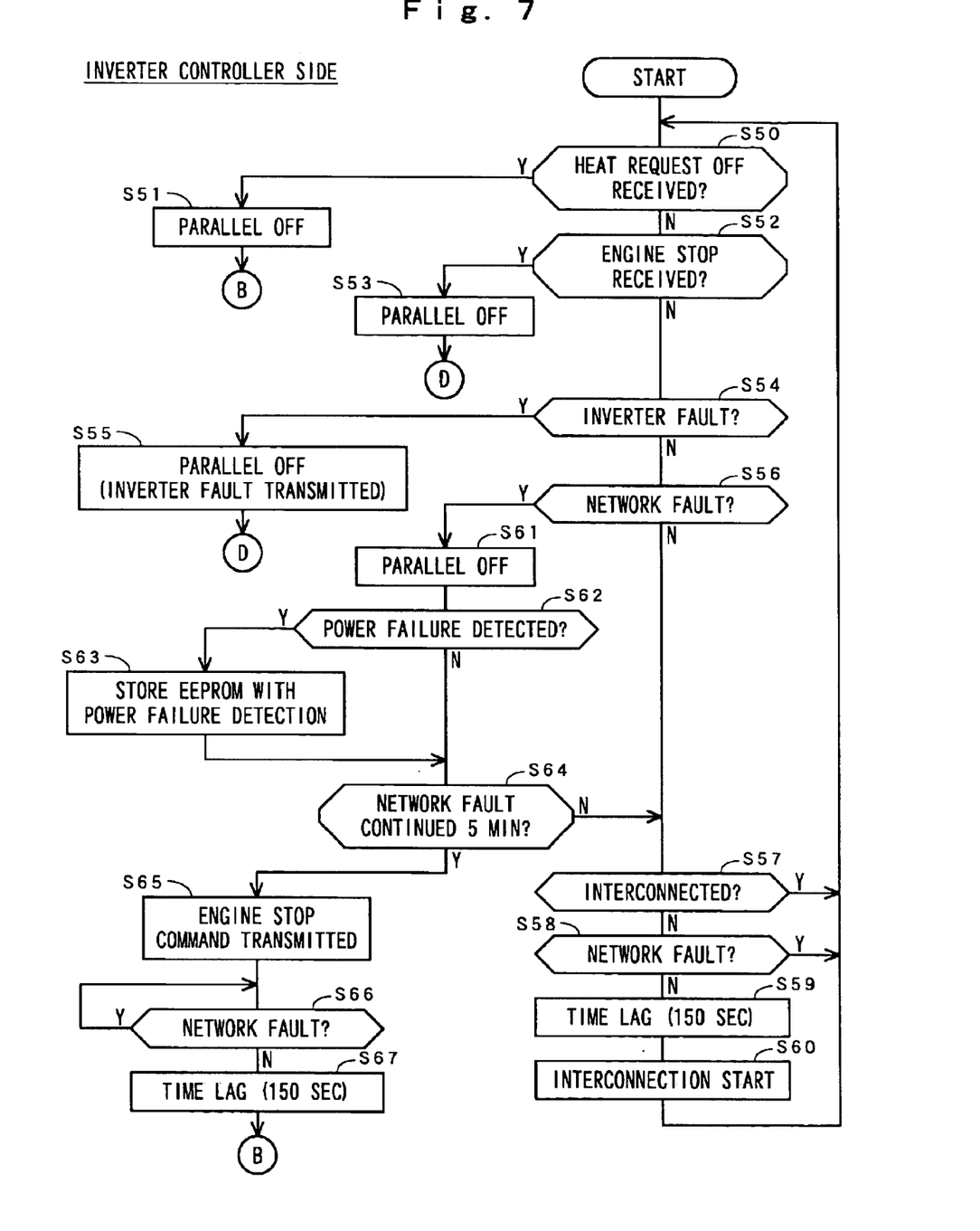
FIG. 7 is a flowchart showing the operation of the inverter controller when a fault occurs.

The process of the inverter controller 137 will now be explained referring to FIG. 7. It is examined at Step S50 whether the heat request off is received or not from the ECU 38. When the heat request off is received, the interconnection with the power network is released at Step S51 and the procedure moves back to Step S18 (FIG. 5). When the heat request off is not received, the procedure advances to Step S52 where it is examined whether the signal of the engine stop is received or not. When signal of the engine stop is received, the parallel operation is released at Step S53 and the procedure returns to Step S18. If the signal of the engine stop is not received, it is examined at Step S54 whether or not the inverter unit 13 has a fault. When the inverter unit 13 has a fault, the procedure goes to Step S55 for releasing the interconnection to the commercial power network and the procedure moves back to Step S18.

If the inverter unit 13 has no fault, it is then examined at Step S56 whether the power network has a fault or not. When the power network has not a fault, the procedure goes to Step S57 where it is examined whether the interconnection or parallel operation is established or not. When the parallel operation is established, the procedure returns back to Step S50.

When it is judged at Step S56 that the power network has a fault, the procedure goes to Step S61 for releasing the parallel operation of the networks. It is then examined at Step S62 whether a power failure occurs or not. When the power failure is detected, the nonvolatile memory is stored with the data indicative of the detection of the failure at Step S63. If no power failure is detected, the procedure skips Step S63 and jumps to the Step S64. It is then examined at Step S64 whether the power network fault continues throughout a predetermined length of time (e.g. five minutes) or not. If Step S64 is negative, the procedure goes to Step S57. When the parallel operation is not established, the procedure advances to Step S58 where it is examined whether the power network has a fault or not. When the power network has a fault, the procedure moves back to Step S50. If not, the procedure goes to Step S59 for providing a time lag of a predetermined length of time (e.g. 150 seconds) and then to Step S60. At Step S60, the parallel operation is started. When the fault continues over the predetermined length of time, the procedure goes to Step S65 where the command of stopping the engine 11 is transmitted to the ECU 38. It is then examined at Step S66 whether the power network has a fault or not. When the fault has been eliminated, the procedure goes to Step S67 for providing a time lag of a predetermined length of time (e.g. 150 seconds) and then returned to Step S18 (FIG. 5).

Figure 8:
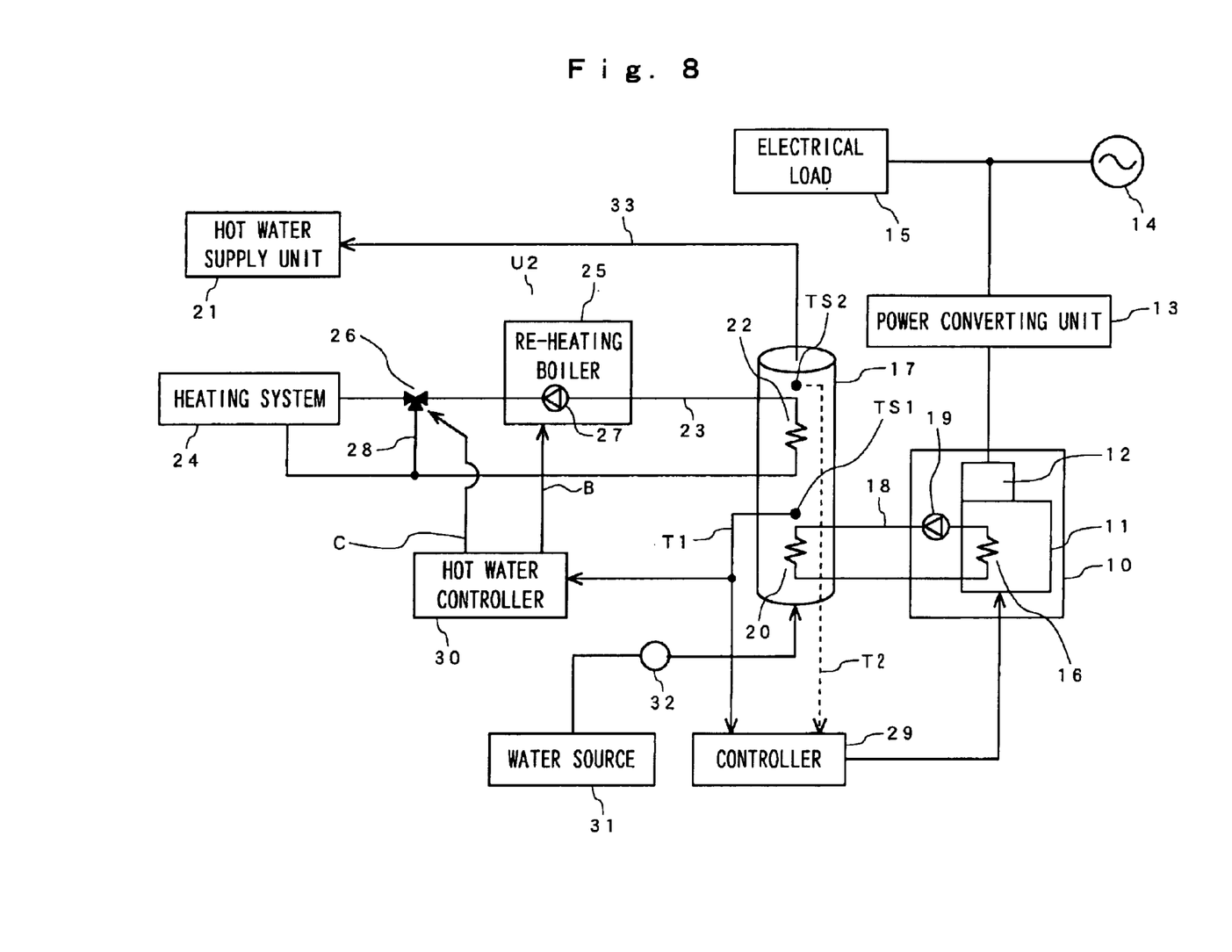
FIG. 8 is a block diagram of a cogeneration system illustrating another embodiment of the present invention.

A cogeneration network according to the present invention will be described which include an apparatus for utilizing heat of the exhaust gas from the engine generator. FIG. 8 is a block diagram of the cogeneration system where like components are denoted by like numerals as those shown in FIG. 1. As the engine 11 drives the generator 12, it generates heat, which is recovered with a heat recovery unit 16 of the engine 11 through heat exchange. The recovery of heat may preferably be carried out on all the high-temperature regions of the engine 11 including a muffler tube. As the cooling water is carried through a tube 18, which extends across the heat recovery unit 16, it serves as a medium for conveying the heat to a hot-water storage tank 17.

The hot water storage tank 17 contains an output heat exchanger (referred to as a first heat exchanger hereinafter) 20 communicated with the conduit 18. The water supplied from a water source 31 to the hot water storage tank 17 is then heated by the first heat exchanger 20 to turn to a hot water. The hot water heated and saved in the hot water storage tank 17 is fed for further use to a hot water supply unit 21, which is a first thermal load.

A second heat exchanger 22 is provided above the first heat exchanger 20 in the tank 17. The second heat exchanger 22 is communicated to a conduit 23, which in turn connected with a heating system 24, such as a central heating system or a floor heating system, acting as a second thermal load. The second conduit 23 forms a second hot water path, which is separated from the hot water path for supplying the hot water from the hot water storage tank 17 to the hot water supply unit 21. The second hot water path 23 performs secondary exchange of the heat from the hot water storage tank 17 thus increasing the efficiency of the heat recovery.

In the second hot water path 23, there are also provided a re-heating boiler 25 and a three-directional valve 26. The re-heating boiler 25 is provided with a pump 27 for circulating the hot water throughout the second hot water path 23. The three-directional valve 26 is a means for switching the flow of the hot water to a bypass 28 or to the heating system 24. The following passages are selected by operating the three-directional valve 26. When the three-directional valve 26 is switched to the heating system 24, the passage is opened for conveying the hot water via the re-heating boiler 25 and the heating system 24 from and to the hot water storage tank 17. When the three-directional valve 26 is switched to the bypass 28, the passage is opened for conveying the hot water via the bypass 28, not the heating system 24, from and to the hot water storage tank 17.

A temperature sensor TS1 is provided in the hot water storage tank 17 and information about the temperature TI of the hot water measured by the temperature sensor TS1 is transmitted to a controller 29. The temperature sensor TS1 may be located at an appropriate height level between substantially the uppermost of the first heat exchanger 20 and the lowermost of the second heat exchanger 22 and most preferably at a midway between the first heat exchanger 20 and the second heat exchanger 22. It is very likely that, due to the effect of convection, the temperature of the hot water is lower than that of the substantially lowermost of the hot water storage tank 17 and higher than that of the substantially uppermost of the hot water storage tank 17. As the temperature sensor TS1 is located at the midway, it can detect an average value of the temperature in the hot water storage tank 17. In response to the temperature information TI, the controller 29 controls the start and stop operation of the engine 11. Since the temperature information TI represents the demand of heat from the hot water supply unit 21 which draws the hot water directly from the hot water storage tank 17 or from the heating system 24 which draws the hot water indirectly via the second heat exchanger 22, the controller 29 judges that the demand exceeds when the temperature information TI is not higher than a reference level Tref-1 and drives the engine 11 to generate the heat. On the other hand, when the temperature information TI is higher than the reference level Tref-1, the controller 29 judges that a sufficient level of the heat energy is saved in the hot water storage tank 17 and turns the heat request off then stops the engine 11.

The reference level Tref-1 of the temperature is determined from multiple parameters of the type and the magnitude of the thermal load (i.e. the type and the capacity of the hot water supply unit 21 and the heating system 24), the thermal output of the engine generator 10, the volume of the hot water storage tank 17, and so on. The reference level Tref-1 has a hysteresis for ensuring a stable operation of the engine 11, i.e. avoiding frequent repetition of start and stop operations.

The engine 11 is operated at a constant speed such that the generator 12 outputs a constant electric power on the basis of the above-mentioned temperature information T1. The engine 11, which is operated at a constant speed in such a way that the number of revolutions becomes almost a constant number so as to output the constant electric power, reduces fuel consumption and keeps a good state of exhaust gas and can be operated at high efficiency. In a case where a demand for large electric power is made to cause a shortage of the electric power generated by the generator 12, the shortage of the electric power can be compensated with the electric power from the commercial power source 14.

In case that the reference temperature of the hot water in the hot water storage tank 17 is hardly maintained with the heat collected from the engine 11, the re-heating boiler 25 functions effectively. The hot water controller 30 provides the re-heating boiler 25 and the three-directional valve 26 with a command "B" for re-heating and a command "C" for switching, respectively. The hot water controller 30 is preset with a lower reference temperature Tref-L which is lower than the reference temperature Tref-1 and when the temperature T1 of the hot water in the hot water storage tank 17 drops down to lower than the lower reference temperature Tref-L, it turns on the re-heating command "B" and the switching command "C". As the re-heating command "B" is turned on, the re-heating boiler 25 starts operating. As the switching command "C" is turned on, the three-directional valve 26 shifts its passage to the bypass 28. Accordingly, the hot water heated by the re-heating boiler 25 circulates through the conduit 23 and increases the temperature of the hot water in the hot water storage tank 17 via the second heat exchanger 22.

A second temperature sensor TS2 is provided above the temperature sensor TS1. When the temperature T1 is below the reference temperature Tref-1 or the temperature T2 outputted by the temperature sensor TS2 is not higher than a reference temperature Tref-2 (>Tref-1), the controller 29 may generate and transfer the heat request to the ECU 38.

When the temperature T1 outputted by the temperature sensor TS1 exceeds a reference temperature Tref-3 (e.g. 70° C.) that is higher than the reference temperature Tref-1, the operation of the engine generator 10 is stopped. It is judged that the energy of heat stored in the hot-water storage tank 17 is sufficient as expressed by the temperature T1 outputted by the temperature sensor TS1 that reaches the reference temperature Tref-3.

A procedure of controlling the start/stop operation of the engine operated generator 10 based on the scale of a thermal load represented by the temperature of water in the hot water storage tank 17 is depicted in the specification of Japanese Patent Application (Heisei) 11-106296 that is filed by this applicant.

Figure 9:
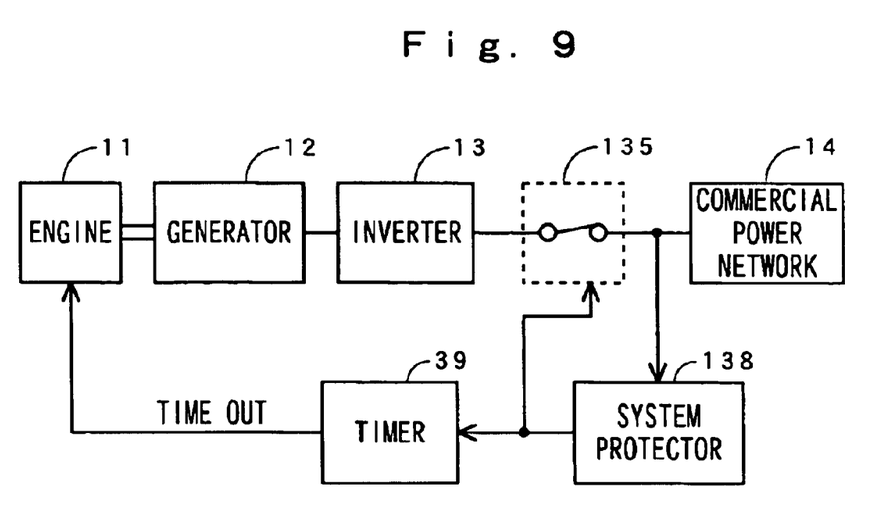
FIG. 9 is a block diagram of a primary part of a conventional engine generator apparatus.

FIG. 9 is a block-diagram illustrating a primary part of the present invention. As shown, a system protector 138 generates a fault signal when detecting a fault in the power network from the voltage and frequency of the power network. Upon receiving the fault signal, a connector relay 135 is opened to cancel the interconnection to the power network and simultaneously a timer 39 is switched on. As the interconnection is canceled, the engine 11 runs with no load. When the fault signal continues until the setting duration (five minutes at Step S64) of the timer 39 is timed up, a time-out signal is released. Upon receiving the time-out signal, the engine 11 stops. When the fault signal is eliminated by removing the cause of the fault before the setting duration of the timer 39 is consumed, the connector relay 135 is closed to establish the interconnection again and the timer 39 is reset.

In the above-mentioned embodiment, when the connection relay to the network is opened and the electric load 15 is isolated from the inverter unit 13, in other words, when the electric load is not applied to the generator at all, the control of the air-fuel ratio based on the oxygen concentration is stopped. However, it is not intended to limit a timing of stopping the control of the air-fuel ratio based on the oxygen density to the time when the electric load is not applied to the generator, but the control of the air-fuel ratio based on the oxygen density may be stopped also at a modified timing when the electric load is not greater than a predetermined load, that is, light load close to no load. This modification is also included by the invention.

For example, in such a construction other than the above construction in which many electric loads are directly connected to the inverter unit 13, in a state where only a small number of electric loads are connected and other electric loads are isolated and not operated, it is determined that the electric loads are light and the control of the air-fuel ratio based on the oxygen density is stopped.

The invention includes also the case where when the engine is started, before load is applied to the engine, the control of the air-fuel ratio based on the oxygen density is not performed but after the load is applied to the engine, the control of the air-fuel ratio based on the oxygen density is performed.

The invention includes also the case where once the load is applied to the engine, the control of the air-fuel ratio based on the oxygen density is performed and even if the load is reduced or released, the control of the air-fuel ratio based on the oxygen density is continuously performed until the engine is stopped.

As is evident from the above description, according to the invention as claimed in claim 1, the control of the air-fuel ratio based on the oxygen density is performed in a region where the electric load not less than a predetermined magnitude is applied to the engine and where the output of the oxygen sensor is inferred to be stable.

According to the invention as claimed in claim 2, the control of the air-fuel ratio based on the oxygen density is stopped in a region where the output of the oxygen sensor is inferred to be unstable.

According to the invention as claimed in claim 3, in a no-load operation produced when the generation system is released from the commercial power supply network because of a system failure such as power failure, the output of the oxygen sensor is inferred to be unstable, so that the control of the air-fuel ratio based on the oxygen density is stopped.

According to the invention as claimed in claims 4 and 5, since the engine is started by a heat request signal, when the generator is driven by the engine, an exhaust heat utilizing unit, that is, electric load is already connected. Therefore, the control of the air-fuel ratio based on the oxygen density can be quickly started after the engine is started.

What is claimed is:

1. An engine generator apparatus comprising:

a generator driven by an engine; and an oxygen density sensor which outputs detection signal used for controlling the air-fuel ratio of the engine, wherein the engine is controlled so as to rotate almost at a constant speed and wherein when the magnitude of an electric load connected to the generator is more than a predetermined value, control of the air-fuel ratio to the engine based on a detection signal received from the oxygen density sensor is started.

2. The engine generator apparatus as claimed in claim 1, wherein when the generator is brought into a no-load operating state, the control of the air-fuel ratio to the engine based on a detection signal of the oxygen density sensor is stopped.

3. The engine generator apparatus as claimed in claim 1 or 2, further comprising:

an output control unit that supplies electric power generated by the generator to the load, and interconnects the electric power to a power network;

failure detection means for detecting a disorder in interconnection of the engine generator apparatus to the power network; and means for releasing the interconnection of the engine generator apparatus to the power network when the failure detection means detects the disorder.

4. The engine generator apparatus as claimed in claim 3, wherein the engine and the generator form parts of a co-generation system provided with an exhaust heat utilizing unit as the electric load; and the engine is started by a heat request signal from the exhaust heat utilizing unit.

5. The engine generator apparatus as claimed in claim 1 or 2, wherein the engine and the generator form parts of a co-generation system provided with an exhaust heat utilizing unit as the electric load; and the engine is started by a heat request signal from the exhaust heat utilizing unit.

* * * * *